R. Pratt,

Horse Rake.

No. 1895 Reissued. Feb. 28. 1865.

Witnesses.

E. Schafer

R. S. Campbell

Inventor.

Rufus Pratt by his Atty.

Mason, Fenwick & Lawrence

UNITED STATES PATENT OFFICE.

RANDAL PRATT, OF MARPLE TOWNSHIP, DELAWARE COUNTY, PA.

IMPROVEMENT IN HORSE HAY-RAKES.

Specification forming part of Letters Patent No. 14,067, dated January 8, 1856; Reissue No. 1,895, dated February 28, 1865.

*To all whom it may concern:*

Be it known that I, RANDAL PRATT, of the township of Marple, Delaware county, State of Pennsylvania, have invented a new and useful Improvement in Horse Hay-Rakes; and I do hereby declare that the following is a full, clear, and exact description of that part of my invention which relates to Division No. 3, reference being had to the accompanying drawings, making a part of this specification, in which—

Figure 2:
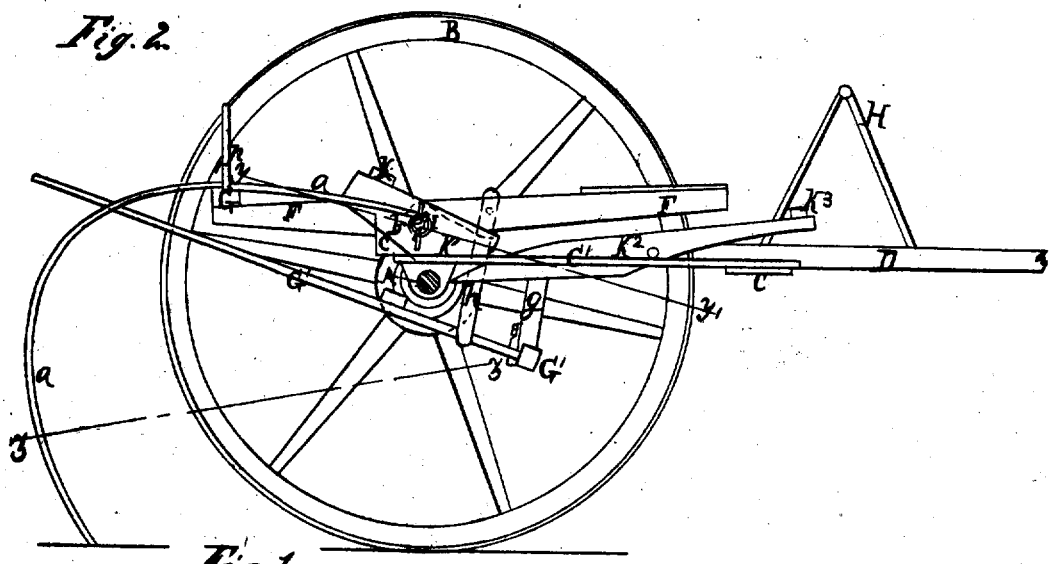
Figure 1:
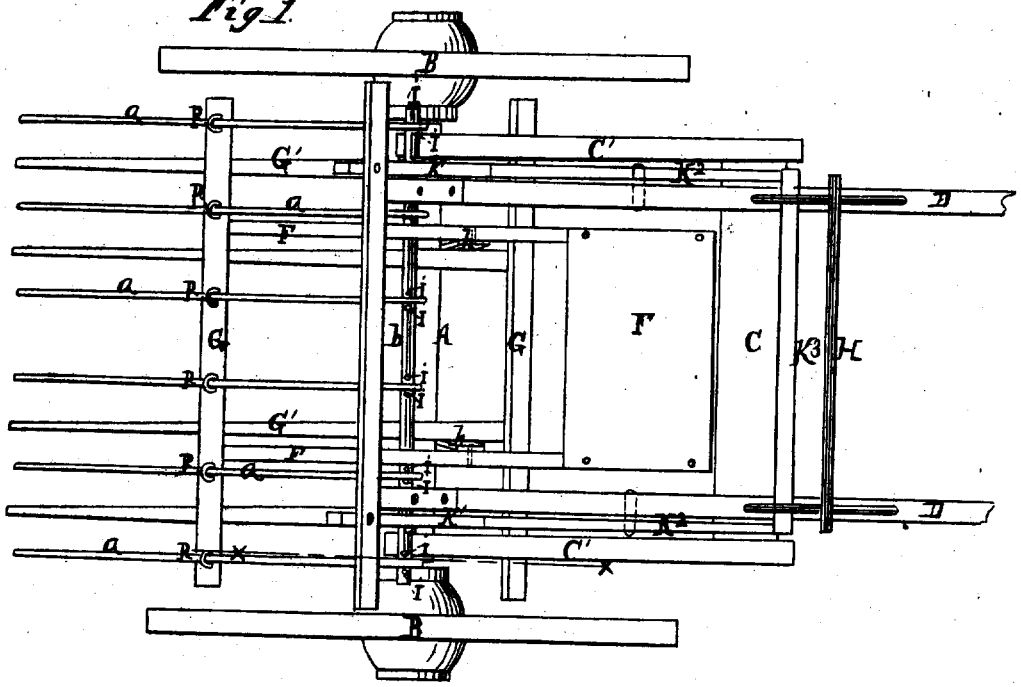

Figure 1 is a plan view of my improved rake. Fig. 2 is a vertical longitudinal section of the same in the line *x x* of Fig. 1.

Similar letters of reference in the two figures indicate corresponding parts.

The nature of my invention consists in the employment of staple-guides to rake-teeth, as will be hereinafter described.

The object of my invention under this patent is to lessen the expense of devices used for guiding each of the respective teeth; also, to reduce the weight and cumbrous character of said devices, and also of the rake in this part of its construction. The staple-guides afford a support laterally to rake-teeth at a point some distance in rear of the point where they are hung, and also allow each tooth to move upward without liability of becoming displaced.

To enable others skilled in the art to make and use my invention, I will proceed to describe its construction and operation.

In the accompanying drawings, A represents the axle-tree of the carriage, and B B the supporting-wheels therefor. C is a platform or stand-board for the driver, and D are the thills. The rake-teeth are hinged to a horizontal bar, *b*, which is supported above and upon the axle, as represented, so as to firmly support the bar *b*. The teeth *a* are each hinged to this bar, by any form of movable joint, in such manner that each tooth can rise or fall—*i. e.*, vibrate about its axis—independently of the others. The movable joints are here represented as formed by coiling the wire of the tooth into an eye around the bar *b*, and confining said eye from lateral play by means of side stops *i i*. These joints are so arranged that the teeth are kept a proper distance apart at their articulating ends. Now, to keep the curved rear portions of the teeth steady and from getting too near together, I have applied to the rake-bar *b* a rocking frame, F, which has a foot-board secured to its forward end and a horizontal transverse bar, G, secured to its rear end, which latter end projects beyond the bar *b*, under the curved teeth some distance. On the bar G are arranged a number of guides, *p*, one for each tooth, and through these guides the teeth pass, as shown in the drawings. The guides *p* are in the form of loops or staples with their ends secured into the bar G, and they should be of sufficient length to allow the teeth to rise and fall, so that they can relieve themselves of obstructions striking their lower ends. The upper ends of the guides are closed to prevent the teeth from being casually thrown out of their places, either from meeting with obstructions in their path or from any other cause. The arrangement of the guides on the rocking frame, as shown, enables me to keep the curved portions of the teeth a uniform distance apart, and the operator, mounted on the platform C, raises or allows the rake-teeth to fall, and as the bar G extends beneath the curved part of all the teeth, it will raise all of the teeth simultaneously out of raking position, or allow them to fall back to this position, where they may be held by a pressure-bar, *k*, or its equivalent. As the teeth rise or fall, or while they are raking, their forward pivoted ends cannot be thrust out of place laterally. Nor can their rear curved portions at the points where the guides *p* are applied be readily displaced.

What I claim as my invention, and desire to secure by Letters Patent, is—

The staple-guides *p* to rake-teeth, substantially as and for the purposes set forth.

RANDAL PRATT.

Witnesses:

GEO. H. RIGBY,

EZRA SMEDLEY.